Aug. 12, 1958     G. F. FARLEY ET AL     2,847,175
REVOLVING STAND

Filed Jan. 30, 1956     5 Sheets–Sheet 1

Inventors
George F. Farley
Arnold Hildebrandt
By
Attorney

Aug. 12, 1958

G. F. FARLEY ET AL 2,847,175

REVOLVING STAND

Filed Jan. 30, 1956

Inventors
George F. Farley
Arnold Hildebrandt
Attorney

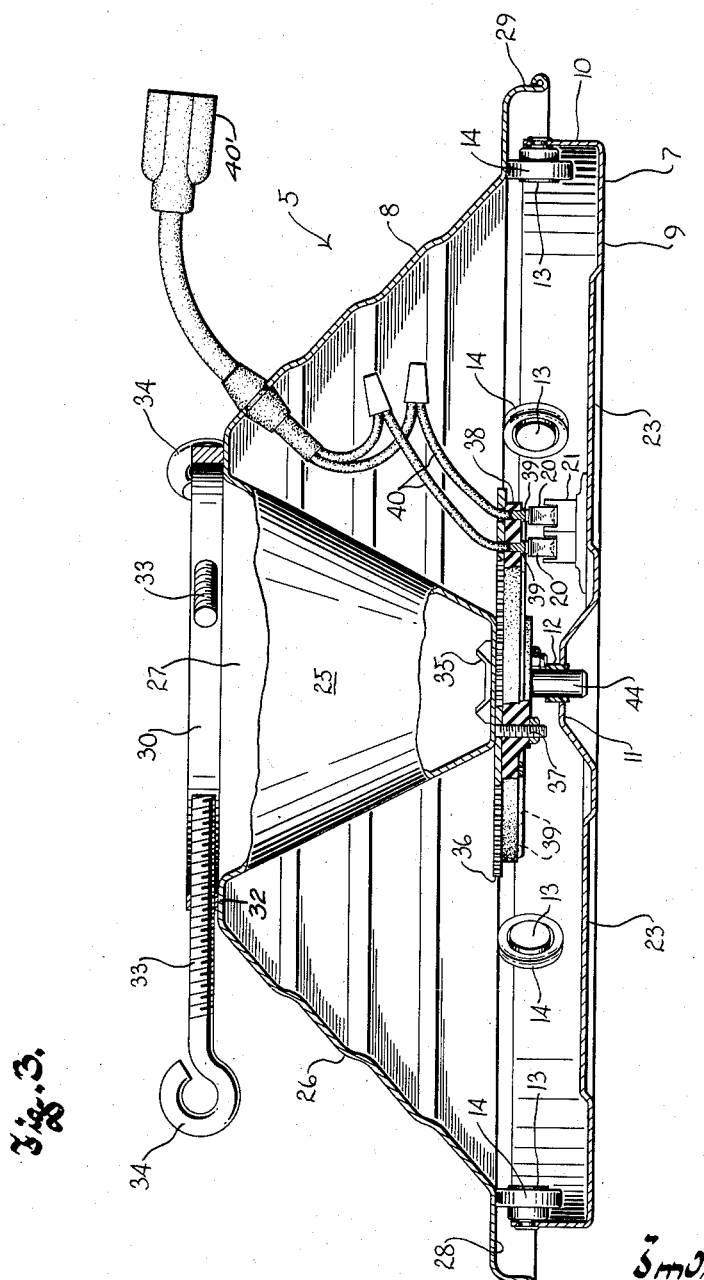

Aug. 12, 1958          G. F. FARLEY ET AL          2,847,175
                          REVOLVING STAND
Filed Jan. 30, 1956                              5 Sheets-Sheet 4
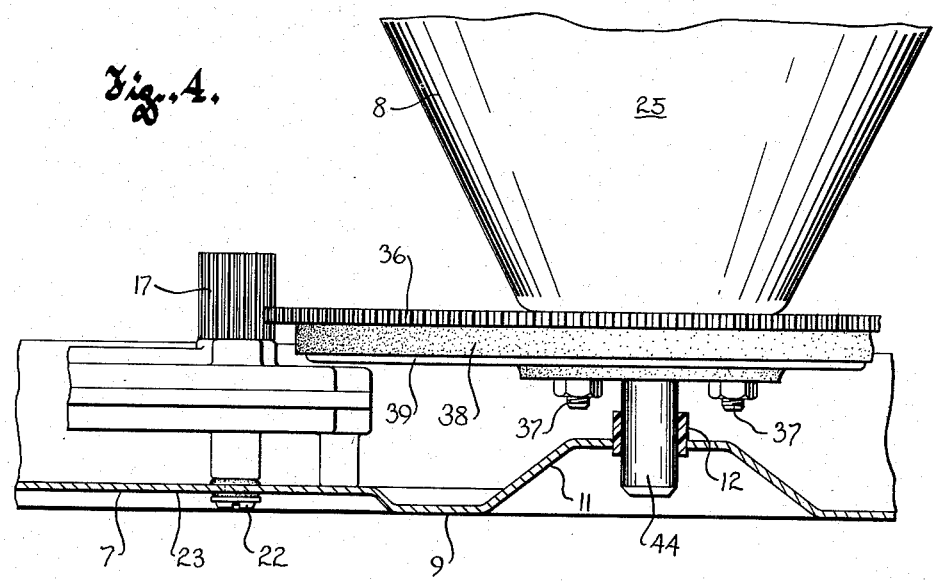
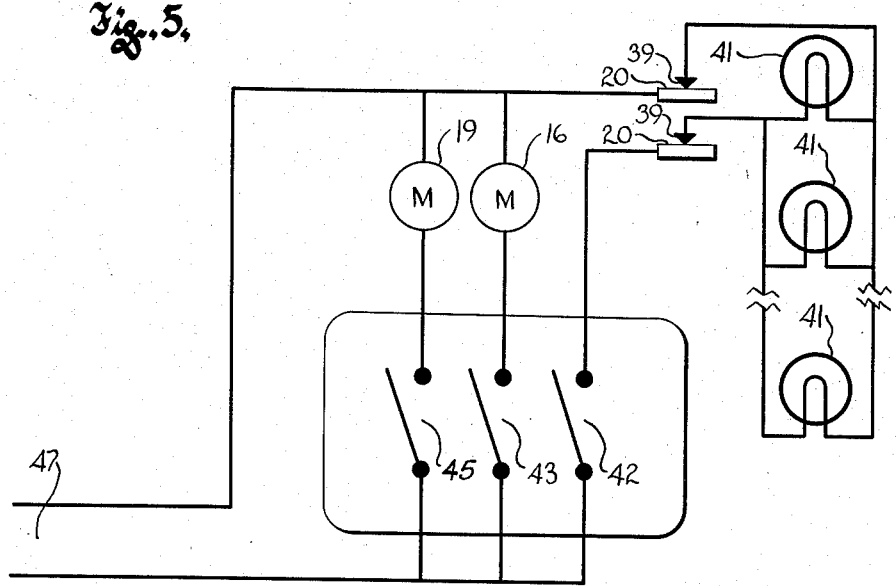

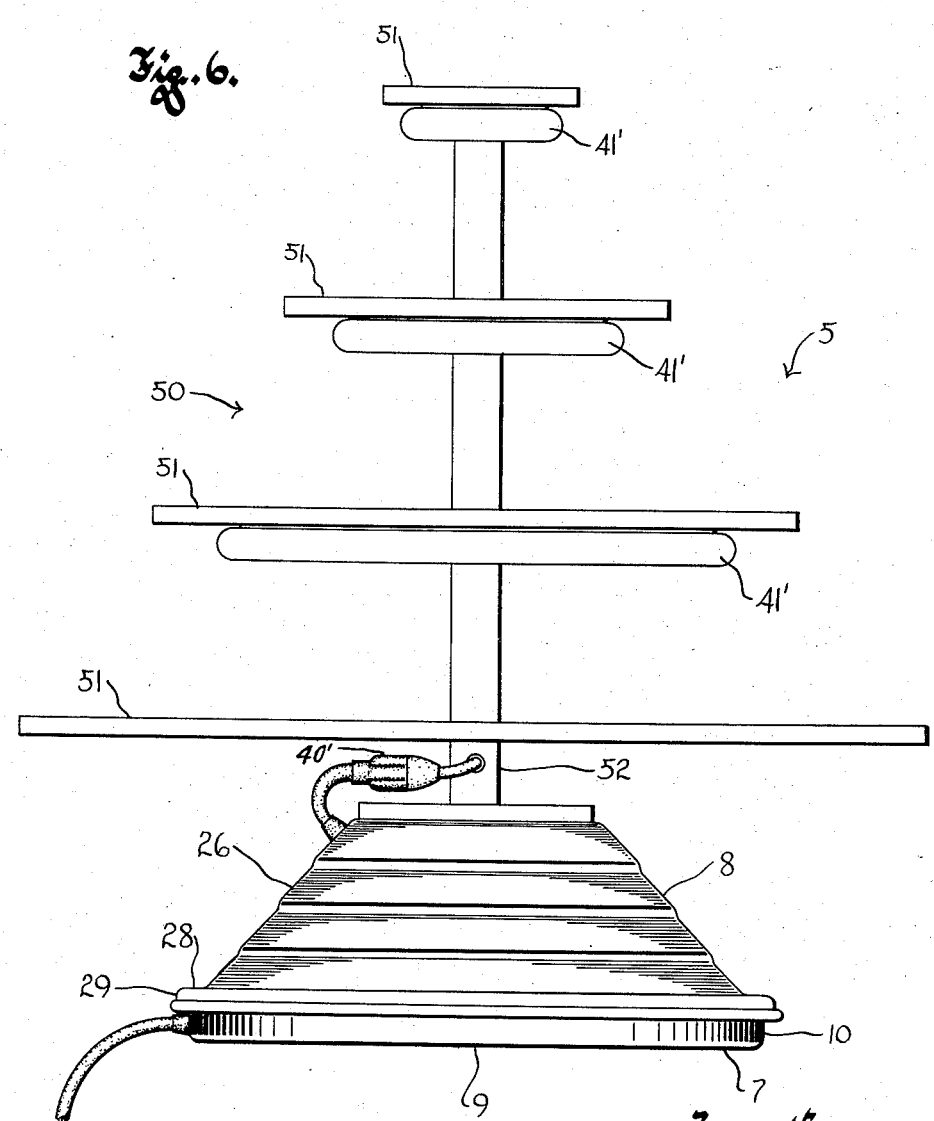

United States Patent Office 2,847,175
Patented Aug. 12, 1958

2,847,175

REVOLVING STAND

George F. Farley, Elm Grove, and Arnold Hildebrandt, Milwaukee, Wis., assignors to Spincraft, Inc., Milwaukee, Wis., a corporation of Wisconsin Application January 30, 1956, Serial No. 562,274

1 Claim. (Cl. 248—45)

This invention relates to stands and bases for Christmas trees and other articles and refers more particularly to a revolving stand adapted to provide a secure base on which a Christmas tree or other article is held upright and by which it is rotated so that the article is displayed to best advantage.

It is an object of this invention to provide a revolving Christmas tree stand in which trees of a wide variety of sizes may be readily mounted and by which a tree may be securely supported in an upright position, which stand is attractive in appearance by reason of the fact that the entire visible portion thereof revolves with the tree, the stationary part being concealed.

Another object of this invention resides in the provision of a revolving stand for Christmas trees and other articles having novel means for rotatably mounting the upper rotatable member of the stand on its lower fixed member and for holding the fixed and movable members of the stand concentric with one another.

Still another object of this invention resides in the provision of a revolving stand which provides for optional illumination of lights on a tree or other article supported in the stand, with the stand either revolving or stationary, and in which stand a music box may be concealed.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 3 is a sectional view of the Christmas tree stand taken on the plane of the line 3—3 in Figure 2;

Figure 4 is a fragmentary sectional view of the stand taken on the plane of the line 4—4 in Figure 2;

Figure 5 is a circuit diagram showing wiring for the revolving stand of this invention and its associated controls for a motor by which the stand is rotated, for a music box motor and for a light circuit; and Figure 6 is a side elevational view of a rotating display rack embodying the principles of this invention.

Figure 1:
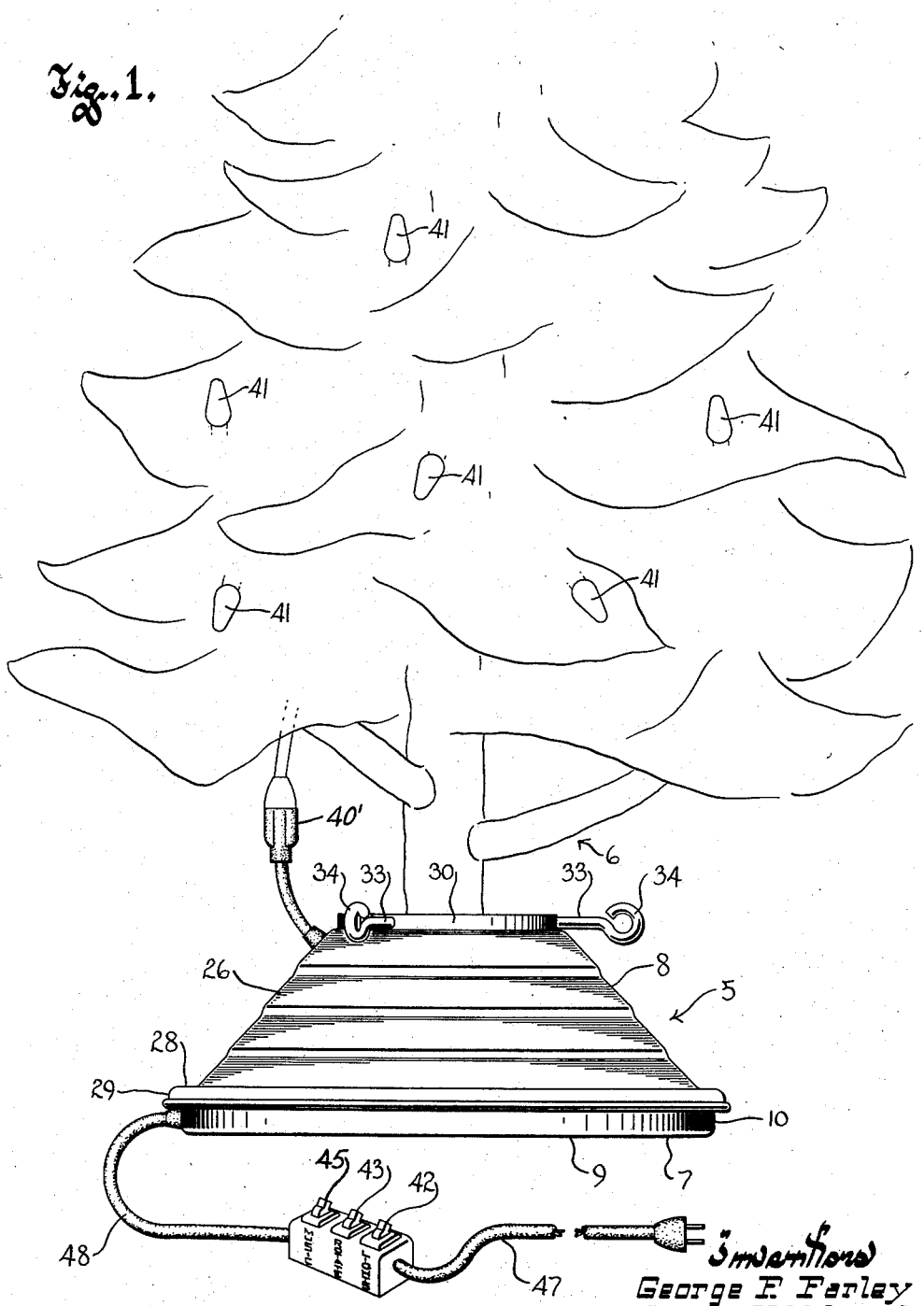
Figure 1 is a side elevational view of a revolving Christmas tree stand embodying the principles of this invention and having a tree mounted therein.
Figure 2:
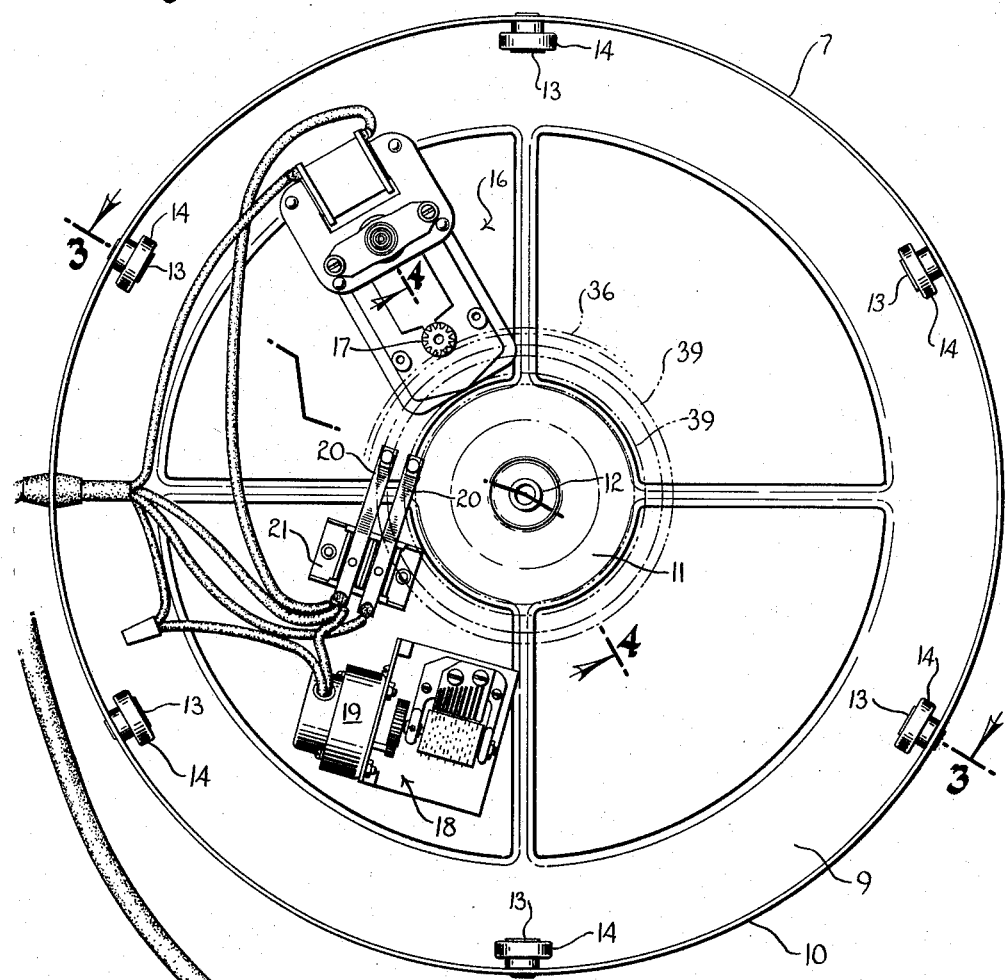
Figure 2 is a plan view of the fixed bottom member of the revolving stand.
Figure 2:
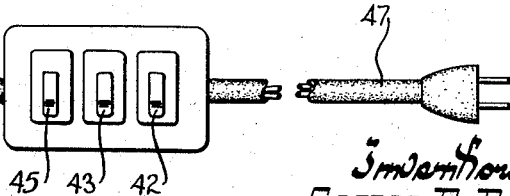

Referring now more particularly to the accompanying drawings, in which like numerals designate like parts throughout the several views, the numeral 5 designates generally the revolving stand of this invention shown in Figure 1 as a Christmas tree stand having a Christmas tree 6 mounted therein. The stand comprises generally a lower pan-like stationary base member 7 and an upper rotatable tree supporting member 8, both of said members being circular in plan.

Both members 7 and 8 are preferably formed as metal spinnings. The lower stationary member has a substantially flat bottom wall 9 adapted to rest on a level surface, an integral upstanding circumferential flange 10, and an upwardly projecting boss 11 at its center having a nylon sleeve or similar bearing 12 secured therein. At circumferentially spaced intervals around the flange, horizontal radially inwardly projecting trunnions 13 are secured thereto, and a roller 14 of nylon or the like is freely rotatably journaled on each of the trunnions.

The peripheries of these rollers project slightly above the flange 10 and cooperate in rotatably supporting the upper member as hereinafter described.

Also secured to the bottom member are an electric motor 16 which rotatably drives a pinion 17 by which the upper member is revolved, a music box 18 of well known type, preferably driven by its own electric motor 19, and a pair of brushes 20 mounted on an insulative block-like holder 21. The drive motor, music box and brush holder may be secured in the lower pan-like member by means of bolts 22 or the like, and the portions of the bottom wall 9 upon which these units are mounted are preferably raised slightly above the remainder thereof, as at 23, to provide clearance for the mounting bolt heads so that the stand can rest steadily on a level floor.

The upper rotatable member comprises a central socket portion 25 and an integral outer frusto-conical skirt portion 26. The side wall of the socket portion is also frusto-conical, tapering downwardly and inwardly to define an upwardly opening well 27, widest at its mouth, in which the lowermost portion of a Christmas tree trunk may be received. The frusto-conical skirt portion 26 extends downwardly from the top of the socket portion and flares outwardly. At its wider bottom portion, it terminates in a radially projecting circumferential flange 28 to provide a downwardly facing shoulder which rests upon the peripheries of the rollers 14 to thereby freely rotatably support the upper member. A downwardly projecting lip, or rim, 29 on the flange 28 trims the bottom of the upper member and conceals the upper portion of the bottom member and the rollers 14 thereon.

A narrow flat circular wall 32 joins the tops of the side walls of the socket 25 and the conical skirt 26; and projecting up from this circular wall is a ring 30. Into this ring are threaded a plurality of clamping screws 33 which are releasably engageable with the trunk of a tree received in the socket to hold the tree upright. Preferably there are three such screws, disposed at equispaced circumferential intervals around the ring, with their axes radial to the axis of the socket. The clamping screws should preferably have large heads 34, on the order of wing bolts or (as shown) eye bolts, to facilitate their manipulation.

Cooperable with the screws to hold a tree trunk upright is an upwardly projecting spur 35 at the bottom of the frusto-conical well defined by the socket portion of the upper rotatable member. This spur may be formed as a separate sheet metal part spot welded to the bottom of the well and having pointed, upwardly projecting tangs. When the lower part of a tree trunk is set or stepped into the socket, the bottom of the trunk rests on the spur, and the weight of the tree causes the spur to bite into the wood, precluding lateral displacement of the trunk in the well. Obviously the socket portion of the stand can be kept filled with water to prevent too rapid dehydration of the tree.

Rotation is imparted to the upper rotatable member through a driven spur gear 36 concentrically fixed to the bottom of the socket portion of the upper member and meshing with the drive pinion 17 which, of course, also has spur teeth, so that the gear and pinion are readily disengaged or meshed by simple relative axial motion therebetween. The driven gear is held in place by means of studs 37 spot welded to the bottom of the socket portion and projecting downwardly therefrom, the studs also serving to secure an insulative disc 38 to the underside of the driven gear. The insulative disc or plate is preferably of plastic and has molded into it a pair of radially spaced concentric metal collector rings 39 which are exposed at the underside of the disc for cooperation with the brushes 20. The brushes may be of any suitable type, but may be very simply formed as a pair of fingers of resilient metal, each secured at one end to the insulative brush holder 21 and extending upwardly therefrom and in the direction of stand rotation to have the free end of the brush slidably engage the collector ring with which it cooperates. The rings are electrically connected with a plug receiving socket 40' by means of conductors 40 which pass through the wall of the skirt 26 and are supported thereby. Obviously the plug receiving socket 40' could be directly mounted on the skirt 26, and in any event, it and its conductors 40 constitute an electrical outlet means having a plug receiving socket opening to the exterior of the skirt 26 to receive the plug on the end of a string of Christmas tree lights 41. The brushes and a switch 42 connect the collector rings with a source of current, so that the brushes and collector rings provide for energization of the tree lights at any time that the switch 42 is closed, whether or not the tree is revolving.

Coaxially secured to the gear, and projecting downwardly therefrom through and below the insulative plate, is a pilot pin or stub shaft 44 which provides a journal freely rotatably and endwise removably received in the bearing 12 in the stationary bottom member to hold the upper and lower members in coaxial relationship.

Because of the shape of the upper rotatable member, and particularly the opposite taper of its socket and skirt portions, a relatively large annular space is provided in which the drive motor by which the stand is rotated, together with its gearing and the pinion driven thereby, are invisibly housed, as may be the music box 18. These units are, of course, disposed off center on the pan-like bottom member so that they fit under the skirt portion of the upper rotatable member.

The switches 42, 43 and 45 by which the lights, rotation drive motor 16, and music box motor 19 are respectively controlled, are, of course, located outside the stand. Conductor 47 connected with each of the switches provides for connection to a wall outlet, and the switches are, in turn, connected with the units in the stand by means of a cabled conductor 48, the connections of the several units being as shown in Figure 5.

In the embodiment of the invention shown in Figure 6 the rotating stand of this invention supports a display rack 50 comprising a plurality of circular shelves 51 mounted in superimposed spaced apart relationship upon a coaxial standard 52. Preferably each of the shelves is somewhat larger than the one above it, so that merchandise arranged on the shelves may be displayed to best advantage as the apparatus rotates. Since the display rack need not be removably mounted in the rotatable upper stand member, as in the case of a Christmas tree, the clamping screws may be dispensed with and the standard may be permanently secured in an upright position in any suitable manner.

In the embodiment of the invention shown in Figure 6 illumination is provided by annular lights 41' of the fluorescent or neon type, each supported directly beneath one of the shelves so that the shelf thereabove serves as a partial shade for the lamp tube. The wiring circuit of the Figure 6 device is of course identical with the Christmas tree stand embodiment, and obviously a music box may also be incorporated therein if desired.

From the foregoing description, taken together with the accompanying drawings, it will be readily apparent that this invention provides a rotatable stand adapted to provide an exceptionally stable support for a Christmas tree of any of a wide variety of sizes, or to provide a rotatable support for a revolving display rack or similar device wherein only the rotatable supporting member is visible, all of the drive mechanism being concealed. It will also be apparent that the upper rotatable member of the stand may be lifted off of the lower member of the stand at any time, without resorting to the use of tools of any kind to enable separation thereof, to quickly provide access to the inside of the lower member which has all of the operating parts mounted thereon. This greatly facilitates inspection and servicing of the operating parts of the stand.

What we claim as our invention is:

A revolving Christmas tree stand comprising: a stationary base having a substantially flat bottom wall; a rotatable member comprising concentric oppositely tapering inner and outer shells each having an axial length several times greater than the height of the stationary base, the large diameter end of the outer shell being lowermost and having its peripheral portion overlying and substantially encircling the periphery of the stationary base, and the large diameter end of the inner shell being uppermost and joined to the upper small diameter end of the outer shell; a bottom wall closing the bottom of the inner shell so that the inner shell provides a well to receive the trunk of a Christmas tree; means at the mouth of the well to engage the trunk of a tree placed therein to hold it upright and secure it to the rotatable member; cooperating means on the peripheral portion of the rotatable member and on the stationary base to freely rotatably and stably support the rotatable member; a vertical cylindrical bearing fixed to one of said bottom walls at the center thereof and opening towards the other bottom wall; a cylindrical stub shaft fixed to said other bottom wall at the center thereof, rotatably received in the bearing to constrain the rotatable member to rotation about a central vertical axis; the annular space between the inner and outer shells of the rotatable member and above the bottom wall of the stationary base providing a relatively large mechanism compartment; a drive unit comprising an electric motor, a driving pinion having spur teeth and a gear reduction transmission connecting the motor with the pinion; means mounting said drive unit on the bottom wall of the stationary base inside said compartment with the axis of the pinion vertical and with no part of the drive unit obstructing direct access to the pinion from above; electric outlet means on the outer shell, said outlet means having a plug receiving socket opening to the exterior of the shell to receive the plug of a string of Christmas tree lights; a spur gear fixed on the lower end of the inner shell meshing with the pinion; a collector ring fixed with respect to the rotatable member to turn therewith and located below the gear, said collector ring having a pair of downwardly facing concentric contact rings at the underside thereof; conductors connecting said contact rings with said electric outlet means; electric contact brushes mounted on but insulated from the bottom wall of the stationary base, said brushes having upwardly biased end portions pressing against the contact rings; and means for connecting the brushes and the electric motor with a source of current; the teeth of the pinion and of the gear lying substantially parallel with the axis about which the rotatable member turns and the cylindrical stub shaft being readily axially separable from the bearing in which it is received so that the entire upper rotatable member may be quickly and easily lifted off the stationary base.

References Cited in the file of this patent

UNITED STATES PATENTS

| | | |
|---|---|---|
| 1,468,247 | Patten | Sept. 18, 1923 |
| 1,987,994 | Doring | Jan. 15, 1935 |
| 2,058,677 | Fritz | Oct. 27, 1936 |
| 2,512,068 | Mayo | June 20, 1950 |
| 2,733,032 | Farley et al. | Jan. 31, 1956 |